US011993853B2

(12) United States Patent
Hsieh et al.

(10) Patent No.: US 11,993,853 B2
(45) Date of Patent: May 28, 2024

(54) ANTIMICROBIAL AND ADHESION-PROOF TITANIUM TABLEWARE AND MANUFACTURING METHOD OF THE SAME

(71) Applicant: TIMAS TITAN CO., LTD., Taipei (TW)

(72) Inventors: Han-Chun Hsieh, Taipei (TW); Han-Chieh Hsieh, Taipei (TW)

(73) Assignee: TIMAS TITAN CO., LTD., Taipei (TW)

( * ) Notice: Subject to any disclaimer, the term of this patent is extended or adjusted under 35 U.S.C. 154(b) by 0 days.

(21) Appl. No.: 17/947,365

(22) Filed: Sep. 19, 2022

(65) Prior Publication Data

US 2023/0123871 A1 Apr. 20, 2023

(30) Foreign Application Priority Data

Oct. 15, 2021 (TW) ................................ 110138296

(51) Int. Cl.
*C23C 8/12* (2006.01)
*B65D 65/40* (2006.01)
(Continued)

(52) U.S. Cl.
CPC ................ *C23C 8/12* (2013.01); *B65D 65/40* (2013.01); *B65D 81/24* (2013.01); *C22F 1/183* (2013.01);
(Continued)

(58) Field of Classification Search
CPC .... C23C 8/12; C23C 8/02; C23C 8/10; C23C 8/80; C23C 28/04; C23C 28/042; B65D 65/40; B65D 81/24; C22F 1/183; A47G 19/02; A47G 19/14; A47G 21/103; A47G 21/18; A47G 19/12; A47G 19/22; A47G 21/02; A47G 19/00; A47G 21/00; A47G 2400/022; B26B 3/00
See application file for complete search history.

(56) References Cited

FOREIGN PATENT DOCUMENTS

| | | |
|---|---|---|
| CN | 113260734 A | 8/2021 |
| CN | 216569396 * | 5/2022 |

(Continued)

OTHER PUBLICATIONS

Machine Translation of CN 216569396 (Year: 2022).*

*Primary Examiner* — James C Yager
(74) *Attorney, Agent, or Firm* — Li & Cai Intellectual Property (USA) Office

(57) ABSTRACT

An antimicrobial and adhesion-proof titanium tableware and a manufacturing method of the same are provided. The antimicrobial and adhesion-proof titanium tableware is made of a titanium substrate, and includes a contact portion and an oxidation layer structure. The contact portion is used for contacting foods, food ingredients, drinking water, beverages, or body parts of a user. The oxidation layer structure is formed on one part of a surface of the titanium substrate corresponding to the contact portion. The titanium substrate is made of titanium in α phase, and the oxidation layer structure is a titanium dioxide film in a rutile crystalline form. The oxidation layer structure has a roughened surface and an oxygen diffusion layer formed at an interface of the oxidation layer structure and the titanium substrate.

4 Claims, 15 Drawing Sheets

(51) Int. Cl.

| | |
|---|---|
| ***B65D 81/24*** | (2006.01) |
| ***C22F 1/18*** | (2006.01) |
| ***C23C 8/02*** | (2006.01) |
| *A47G 19/02* | (2006.01) |
| *A47G 19/14* | (2006.01) |
| *A47G 21/06* | (2006.01) |
| *A47G 21/18* | (2006.01) |
| *B26B 3/00* | (2006.01) |

(52) U.S. Cl.
CPC ................ *C23C 8/02* (2013.01); *A47G 19/02* (2013.01); *A47G 19/14* (2013.01); *A47G 21/103* (2013.01); *A47G 21/18* (2013.01); *B26B 3/00* (2013.01)

(56) References Cited

FOREIGN PATENT DOCUMENTS

| | | | |
|---|---|---|---|
| JP | 200181544 | A | 3/2001 |
| JP | 2020183551 | A | 11/2020 |
| WO | WO2020223376 | * | 11/2020 |

* cited by examiner

ANTIMICROBIAL AND ADHESION-PROOF TITANIUM TABLEWARE AND MANUFACTURING METHOD OF THE SAME

CROSS-REFERENCE TO RELATED PATENT APPLICATION

This application claims the benefit of priority to Taiwan Patent Application No. 110138296, filed on Oct. 15, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antimicrobial and adhesion-proof titanium tableware and a manufacturing method of the same, and more particularly to an antimicrobial and adhesion-proof titanium tableware that is used in drinking water, eating foods, or cooking foods, and a manufacturing method of the same.

BACKGROUND OF THE DISCLOSURE

Due to the pursuit of a healthy lifestyle, tableware used in modern households is required to be non-toxic and cause zero pollution. Since titanium has the characteristics of light weight, high temperature resistance, corrosion resistance, and low heat conductivity, more and more tableware pieces are made of titanium.

When titanium comes into contact with air, an oxidation layer is formed on a surface of the titanium, and the protective effect of the oxidation layer can improve the wear resistance and corrosion resistance characteristics of titanium tableware. However, a thickness of the oxidation layer naturally generated by titanium in the air is only a few angstroms (Å), so that the oxidation layer is easily worn out. In addition, since a crystalline form of the oxidation layer on the titanium is polycrystalline, the surface of the titanium that has not undergone a surface treatment is matte and has limited catalytic activity, which results in being not adhesion-proof and having limited antimicrobial capability.

For the abovementioned reasons, the antimicrobial and adhesion-proof ability of the titanium tableware is limited and in need of further improvement.

SUMMARY OF THE DISCLOSURE

In response to the above-referenced technical inadequacies, the present disclosure provides an antimicrobial and adhesion-proof titanium tableware and a manufacturing method of the same, so as to address insufficient antimicrobial and anti-adhesion properties of existing containers for drinking or eating.

In one aspect, the present disclosure provides an antimicrobial and adhesion-proof titanium tableware. The antimicrobial and adhesion-proof titanium tableware is made of a titanium substrate. The antimicrobial and adhesion-proof titanium tableware includes a contact portion and an oxidation layer structure. The contact portion is used for contacting foods, food ingredients, drinking water, beverages, or body parts of a user. The oxidation layer structure is formed on one part of a surface of the titanium substrate corresponding to the contact portion. The oxidation layer structure is a titanium dioxide film generated by a combination of the titanium substrate and oxygen atoms. The titanium substrate is made of titanium in α phase, and the oxidation layer structure is the titanium dioxide film in a rutile crystalline form that is formed by oxidation of the titanium in α phase. The oxidation layer structure has a roughened surface, and an oxygen diffusion layer is formed at an interface of the oxidation layer structure and the titanium substrate.

In certain embodiments, a thickness of the oxidation layer structure is greater than 3 μm, and a thickness of the oxygen diffusion layer is greater than 1 μm.

In certain embodiments, the oxygen diffusion layer is formed by a solid solution of titanium oxide (TiO) in α phase that is generated by a combination of the oxygen atoms and titanium atoms.

In certain embodiments, an average grain size of the oxidation layer structure is greater than 0.3 μm.

In certain embodiments, an arithmetic average roughness (Ra) and a maximum roughness depth (Rmax) of the roughened surface of the oxidation layer structure are greater than 0.2 μm and 0.8 μm, respectively.

In certain embodiments, the antimicrobial and adhesion-proof titanium tableware further includes an outer portion that is located outside an area of the contact portion and not in contact with the foods, the food ingredients, the drinking water, and the beverages. An outer protective film is formed on another part of the surface of the titanium substrate corresponding to the outer portion, and the outer protective film is formed by technical means different from technical means used to produce the oxidation layer structure, or is formed under processing conditions different from processing conditions from which the oxidation layer structure is produced. The outer protective film is a film made of a titanium-based compound selected from titanium oxide, titanium nitride, or titanium oxynitride.

In another aspect, the present disclosure provides a manufacturing method of an antimicrobial and adhesion-proof titanium tableware. The antimicrobial and adhesion-proof titanium tableware is made of a titanium substrate, and has a contact portion for contacting food, food ingredients, drinking water, beverages, or body parts of a user. The manufacturing method includes a preparation step, an annealing step, a surface treatment step, and an oxidation step. The preparation step includes: using the titanium substrate to produce a tableware preform. The annealing step includes: heating the tableware preform to reach a temperature ranging from 600° C. to 800° C. in a vacuum environment, and maintaining the temperature for 1 hour to 3 hours, so that the tableware preform is annealed and a crystalline structure of α-titanium is formed in the tableware preform. The surface treatment step includes: washing a surface of the tableware preform and removing a primary oxidation layer on the surface of the tableware preform. The oxidation step includes: placing the tableware preform in a vacuum calcination furnace, heating the tableware preform to reach a temperature ranging from 700° C. to 850° C., and introducing in oxygen for allowing one part of the surface of the tableware preform corresponding to the contact portion to be exposed to the oxygen for 3 hours to 12 hours, so that oxygen atoms are combined with titanium atoms of the one part of the surface of the tableware preform corresponding to the contact portion, an oxidation layer structure is formed on the one part of the surface of the tableware preform corresponding to the contact portion, an oxygen diffusion layer is formed at an interface of the oxidation layer structure and the tableware preform, and the tableware preform is further formed into the finished antimicrobial and adhesion-proof titanium tableware. The oxidation layer structure is a titanium dioxide film in a rutile crystalline form, and has a roughened surface. An arithmetic average roughness (Ra) and a maximum roughness depth (Rmax) of the roughened surface of the oxidation layer structure are greater than 0.2 μm and 0.8 μm, respectively.

Therefore, in the antimicrobial and adhesion-proof titanium tableware and the manufacturing method of the same provided by the present disclosure, by virtue of the oxidation layer structure being in the rutile crystalline form, the antimicrobial and anti-adhesion properties of tableware can be improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
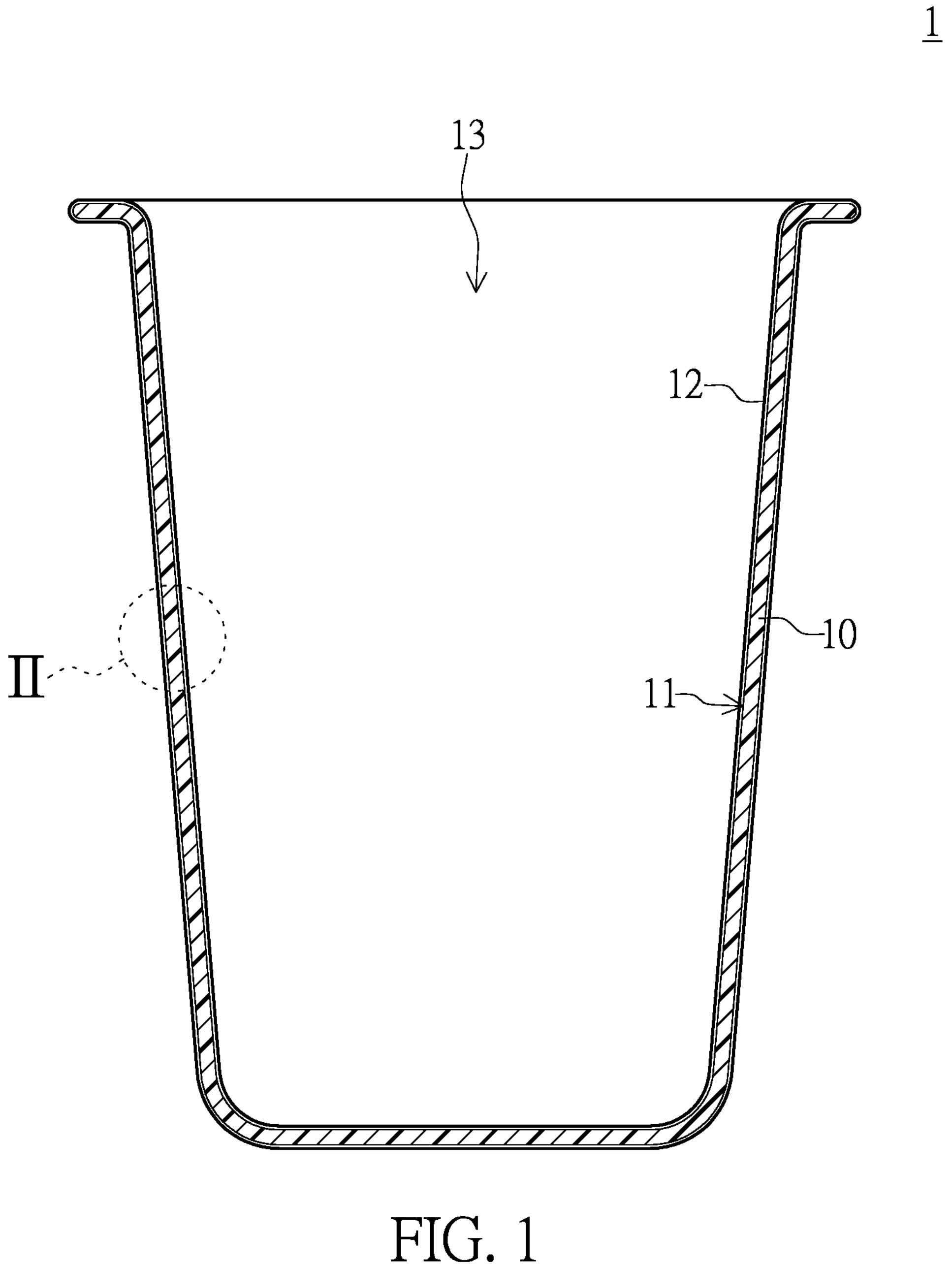
FIG. 1 is a cross-sectional view of an antimicrobial and adhesion-proof titanium tableware according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 9, a first embodiment of the present disclosure provides an antimicrobial and adhesion-proof titanium tableware 1 and a manufacturing method of the antimicrobial and adhesion-proof titanium tableware 1. For ease of understanding the manufacturing method of the antimicrobial and adhesion-proof titanium tableware 1, a structure of the antimicrobial and adhesion-proof titanium tableware 1 is introduced, followed by the manufacturing method of the antimicrobial and adhesion-proof titanium tableware 1.

Figure 2:
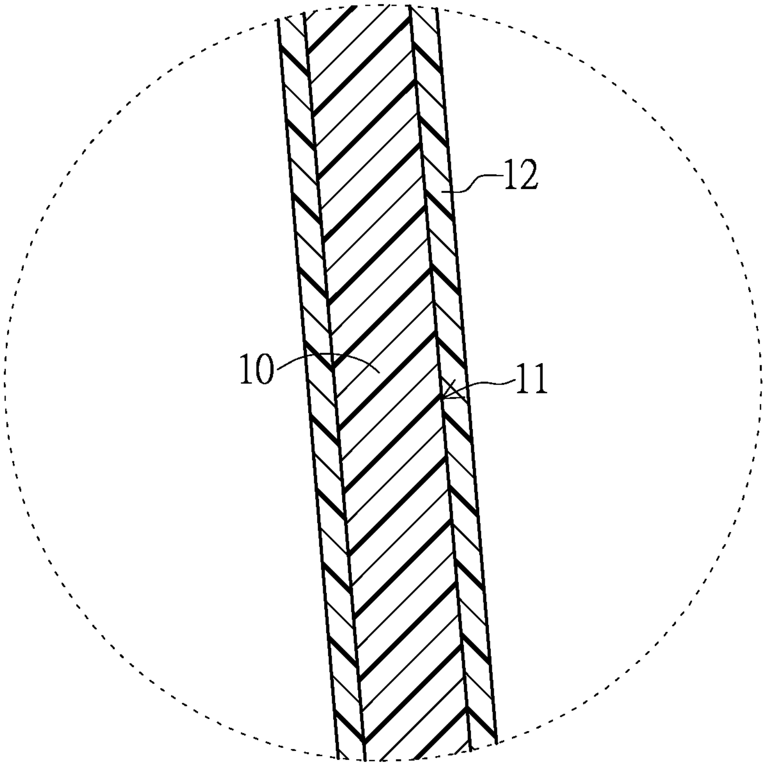
FIG. 2 is a partially enlarged cross-sectional view of the antimicrobial and adhesion-proof titanium tableware according to the first embodiment of the present disclosure.
Figure 3:
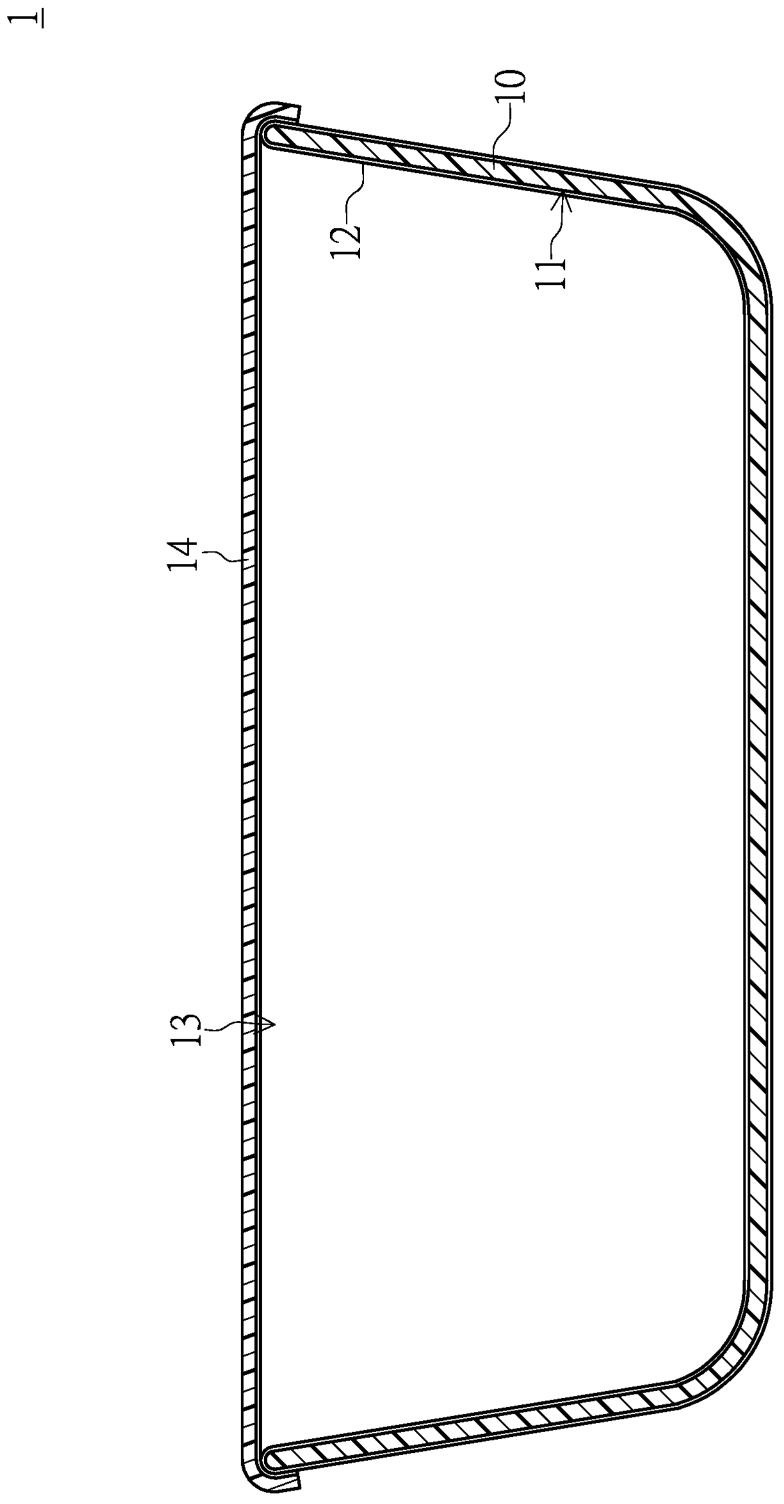
FIG. 3 to FIG. 6 are respectively cross-sectional views of the antimicrobial and adhesion-proof titanium tableware being used as a pan, a water bottle, a straw, and chopsticks according to the first embodiment of the present disclosure.

As shown in FIG. 1 and FIG. 2, the antimicrobial and adhesion-proof titanium tableware 1 provided in this embodiment of the present disclosure is a utensil for a user to contain or contact foods, food ingredients, beverages, or drinking water, so that the user may eat, drink or handle food. Further, the antimicrobial and adhesion-proof titanium tableware 1 has a contact portion 11 for contacting foods, food ingredients, beverages, drinking water, or the mouth and the tongue of the user. The antimicrobial and adhesion-proof titanium tableware 1 includes a titanium substrate 10 that is used to form a main body of the antimicrobial and adhesion-proof titanium tableware 1, and an oxidation layer structure 12 formed on one part of a surface of the titanium substrate 10 corresponding to the contact portion 11. The titanium substrate 10 is made of titanium in α phase, and the oxidation layer structure 12 is a film of titanium oxide formed on the surface of the titanium substrate 10 after oxidation of the titanium in α phase.

In this embodiment, the antimicrobial and adhesion-proof titanium tableware 1 is a cup for holding drinking water or beverages. A concave-shaped holding space 13 is formed inside the antimicrobial and adhesion-proof titanium tableware 1, and can be used for holding drinking water, beverages, or foods. The contact portion 11 is formed on a surface of the holding space 13 inside the antimicrobial and adhesion-proof titanium tableware 1. For the antimicrobial and adhesion-proof titanium tableware 1, the oxidation layer structure 12 is at least formed on the one part of the surface of the titanium substrate 10 corresponding to the contact portion 11.

It should be noted that, although the antimicrobial and adhesion-proof titanium tableware 1 is the cup in this embodiment, the present disclosure is not limited thereto. For example, in the embodiment shown in FIG. 3, the antimicrobial and adhesion-proof titanium tableware 1 is a pan, a food-containing basin, a plate, a bowl or a TUPPERWARE® container made of the titanium substrate 10. The antimicrobial and adhesion-proof titanium tableware 1 is shaped in the form of a basin with a wide opening, and a cover 14 can be placed at the opening of the antimicrobial and adhesion-proof titanium tableware 1.

Figure 4:
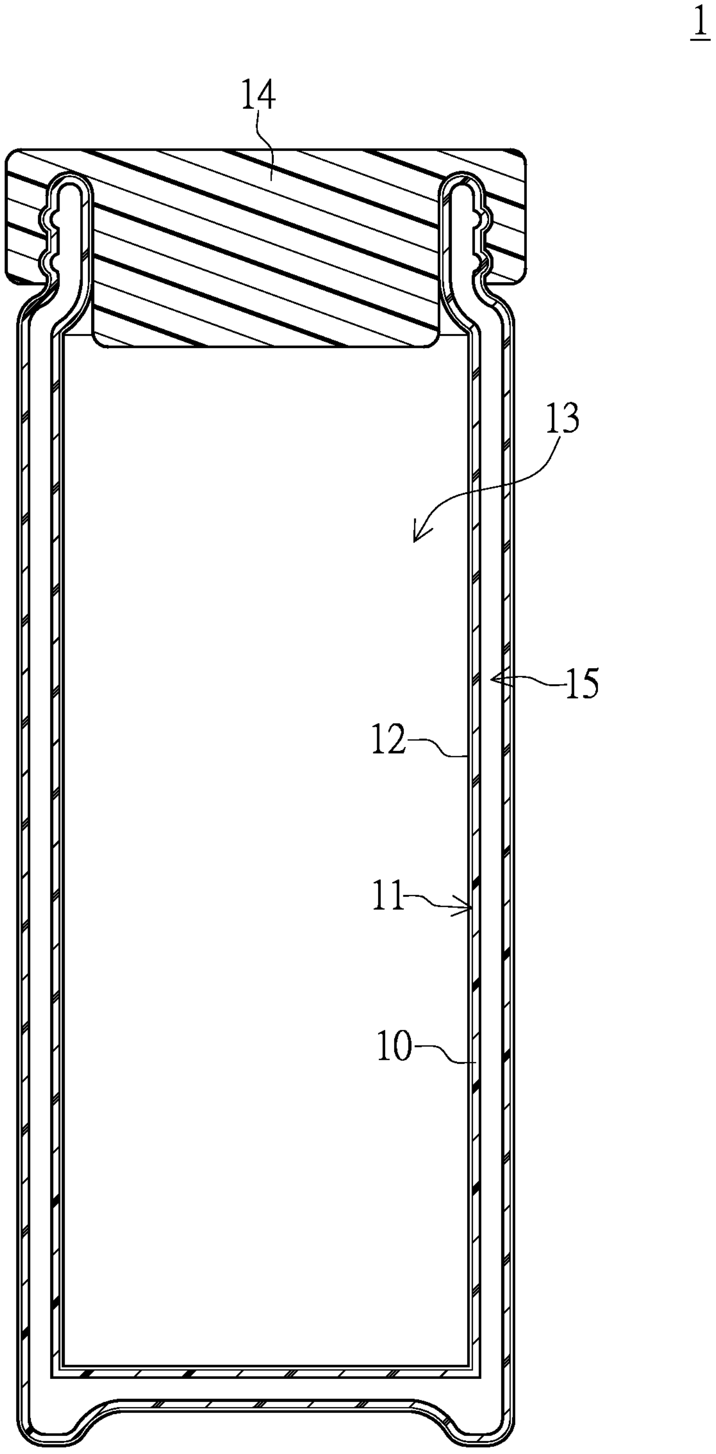

As shown in FIG. 4, the antimicrobial and adhesion-proof titanium tableware 1 is a water bottle made of the titanium substrate 10, and the antimicrobial and adhesion-proof titanium tableware 1 is a cylindrical bottle. The antimicrobial and adhesion-proof titanium tableware 1 has an opening at an upper end thereof, the cover 14 is placed at the opening, and the antimicrobial and adhesion-proof titanium tableware 1 has a vacuum layer 15 therein, so as to have a temperature retaining capability. The contact portion 11 is formed on a surface of an accommodating space inside the antimicrobial and adhesion-proof titanium tableware 1, and the oxidation layer structure 12 is formed on the one part of the surface of the titanium substrate 10 corresponding to the contact portion 11.

Figure 5:
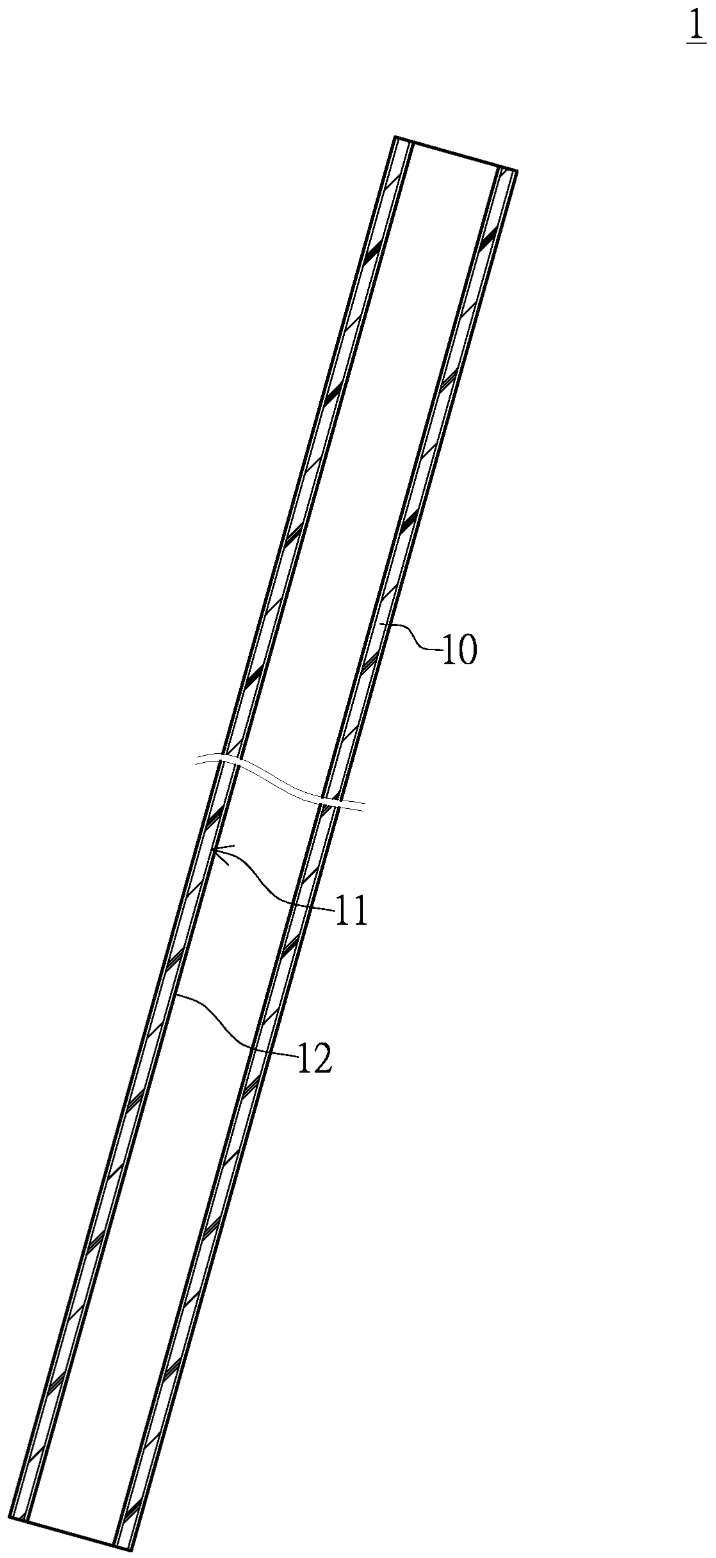

As shown in FIG. 5, the antimicrobial and adhesion-proof titanium tableware 1 is a hollow tube made of the titanium substrate 10, thereby forming a straw. The contact portion 11 is formed on inner and outer surfaces of the hollow tube, and the oxidation layer structure 12 is formed on the one part of the surface of the titanium substrate 10 corresponding to the contact portion 11.

Figure 6:
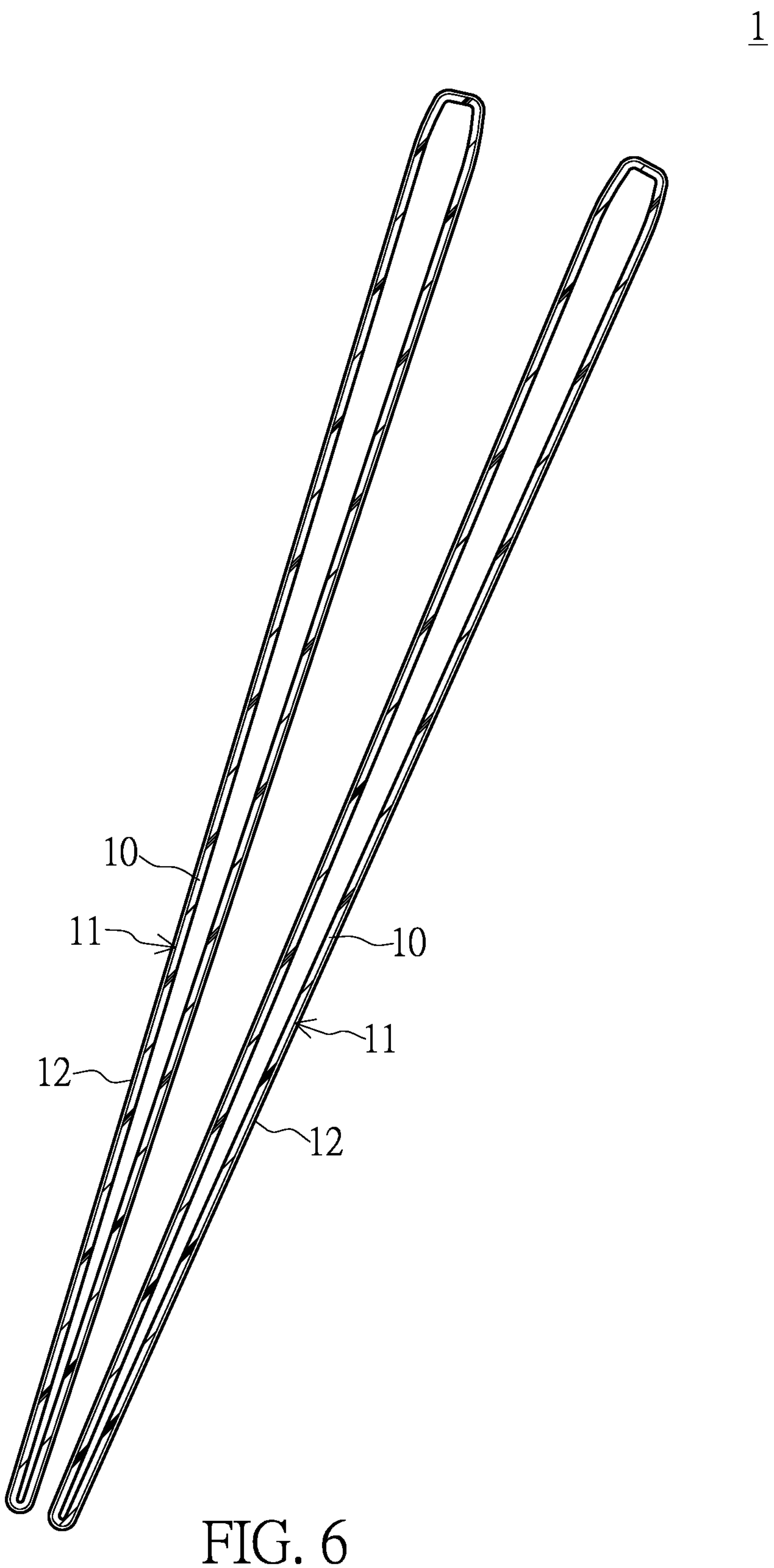

In the embodiment shown in FIG. 6, the antimicrobial and adhesion-proof titanium tableware 1 refers to chopsticks made of the titanium substrate 10, the antimicrobial and adhesion-proof titanium tableware 1 is rod-shaped, and the contact portion 11 is formed at one end of each piece of the antimicrobial and adhesion-proof titanium tableware 1 for holding food. Furthermore, the oxidation layer structure 12 is formed on the one part of the surface of the titanium substrate 10 corresponding to the contact portion 11.

It should be noted that, in addition to those described in the abovementioned embodiments, the antimicrobial and adhesion-proof titanium tableware 1 of the present disclosure can be other types of tableware. For example, the antimicrobial and adhesion-proof titanium tableware 1 can also be a knife, a spoon, a spatula, a tea strainer, or tableware of other types.

Figure 7:
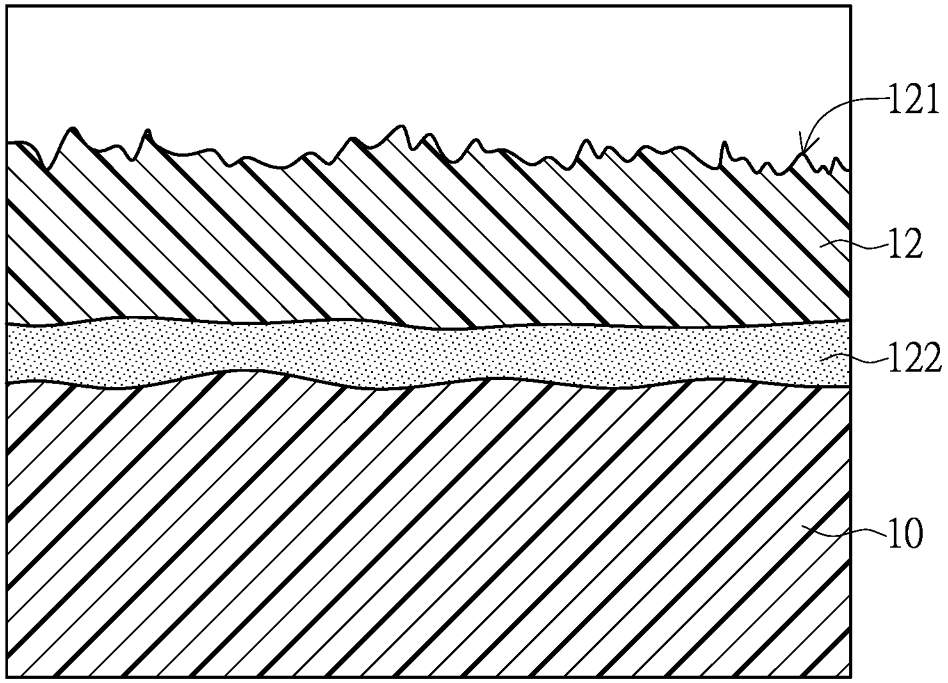
FIG. 7 is an enlarged cross-sectional view of a multi-layered structure including an oxidation layer structure, an oxygen diffusion layer, and a titanium substrate according to the first embodiment of the present disclosure.
Figure 8:
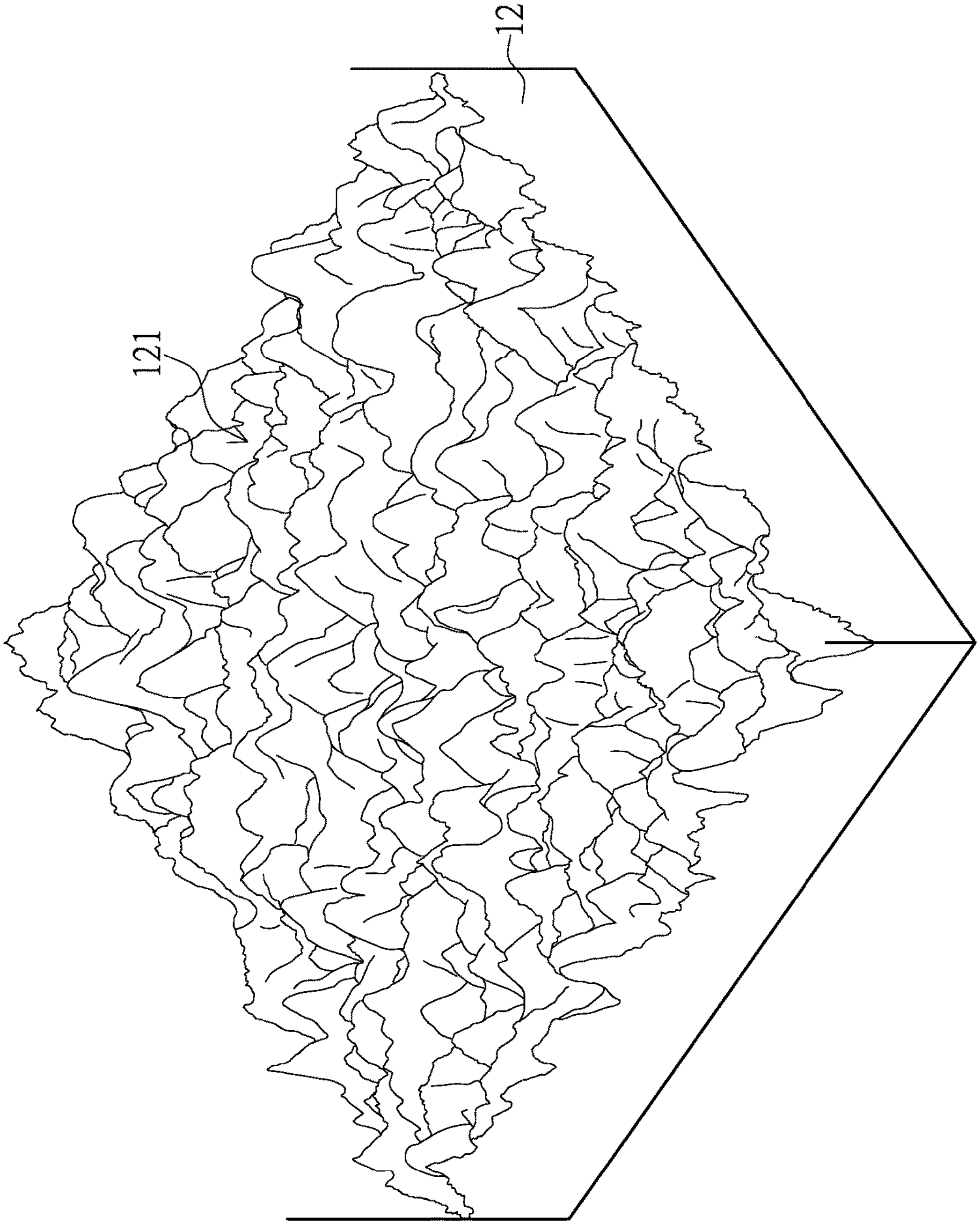
FIG. 8 is a stereo electron microscope image of the oxidation layer structure according to the first embodiment of the present disclosure.

The following description relates to the oxidation layer structure 12 on a surface of the antimicrobial and adhesion-proof titanium tableware 1 of the present disclosure. As shown in FIG. 7 and FIG. 8, the oxidation layer structure 12 on the surface of the antimicrobial and adhesion-proof titanium tableware 1 of the present disclosure is mainly made of titanium dioxide ($TiO_2$) in a rutile crystalline form that is formed by oxidation of a surface material of the titanium substrate 10 in α phase. When the oxidation layer structure 12 is irradiated by light, electrons (e−) of a titanium dioxide material transition from the valence band to the conduction band, thereby leaving positively charged holes (h+) and forming an electron-hole pair. The electrons generated are combined with oxygen molecules to form reductive superoxide ions ($O_2$—), while the holes will react with water on the surface of titanium dioxide to form highly oxidizing hydroxide radicals. The reactive superoxide ions and hydroxide radicals can carry out an oxidation reduction reaction to pollutants or on a surface of an organic matter, so as to decompose the organic matter. In this way, the effect of sterilization, bacterial inhibition, or decontamination can be achieved.

Since the rutile type of titanium dioxide is a crystalline form with high stability, and the rutile type of titanium dioxide has a high specific surface area (as calculated by using Brunauer-Emmett-Teller (BET) theory), the oxidation layer structure 12 has good photocatalytic activity, and the photocatalytic activity thereof is stable and not easily decayed. In addition, since the oxidation layer structure 12 is a film that is ceramicized and has a crystalline form, characteristics of the oxidation layer structure 12 include having a high hardness, being abrasion resistant, and being anti-sticking. Therefore, the antimicrobial and adhesion-proof titanium tableware 1 of the present disclosure is not easily scratched, and foods or drinks are not easily adhered to the surface of the contact portion 11, so as to achieve effects of anti-adhesion and pollution reduction.

In more detail, the oxidation layer structure 12 of the present disclosure is formed on the one part of the surface of the titanium substrate 10 corresponding to the contact portion 11 by a thickness greater than a thickness of a primary oxidation layer made of titanium, and the oxidation layer structure 12 of the present disclosure has a roughened surface 121. In an exemplary embodiment of the present disclosure, the thickness of the oxidation layer structure 12 is greater than 3 μm, and an average grain size of the oxidation layer structure 12 is greater than 0.3 μm. Further, an arithmetic average roughness (Ra) and a maximum roughness depth (Rmax) of the roughened surface 121 are greater than 0.2 μm and 0.8 μm, respectively.

Since the thickness of the oxidation layer structure 12 is far greater than the thickness of the primary oxidation layer naturally formed on the surface of the titanium metal, the oxidation layer structure 12 has a large crystalline grain size, and gaps are easily formed in the crystal lattice. Furthermore, since the oxidation layer structure 12 has the roughened surface 121, a surface of the oxidation layer structure 12 is roughened and in a jagged shape, so that the oxidation layer structure 12 can have an increased contact area and a better catalytic activity.

Furthermore, as shown in FIG. 7, an oxygen diffusion layer 122 can be formed at an interface of the oxidation layer structure 12 and the titanium substrate 10. The oxygen diffusion layer 122 is formed by the oxygen atoms passing through the gaps of the oxidation layer structure 12 when the oxidation layer structure 12 is formed, or is formed by having the oxygen atoms solidly dissolved in the titanium substrate 10 as the oxygen atoms dissociate from an inner layer of the oxidation layer structure 12. The oxygen diffusion layer 122 has a thickness greater than 1 μm, and the oxygen diffusion layer 122 is mainly formed by a solid solution of titanium oxide (TiO) in α phase that is generated by a combination of the oxygen atoms and titanium atoms.

The oxygen diffusion layer 122 is tightly bonded between the titanium substrate 10 and the oxidation layer structure 12. A density of the oxygen diffusion layer 122 is greater than that of the oxidation layer structure 12, and a hardness of the oxygen diffusion layer 122 is greater than that of the oxidation layer structure 12. Therefore, corrosion of titanium substrate 10 can be effectively prevented, and the bonding between the oxidation layer structure 12 and the titanium substrate 10 is more stable.

The manufacturing method of the antimicrobial and adhesion-proof titanium tableware of the present disclosure is described as follows. As shown in FIG. 9 to FIG. 13, a manufacturing method S100 of the antimicrobial and adhesion-proof titanium tableware of the present disclosure includes a preparation step S110, an annealing step S120, a surface treatment step S130, and an oxidation step S140.

Figure 9:
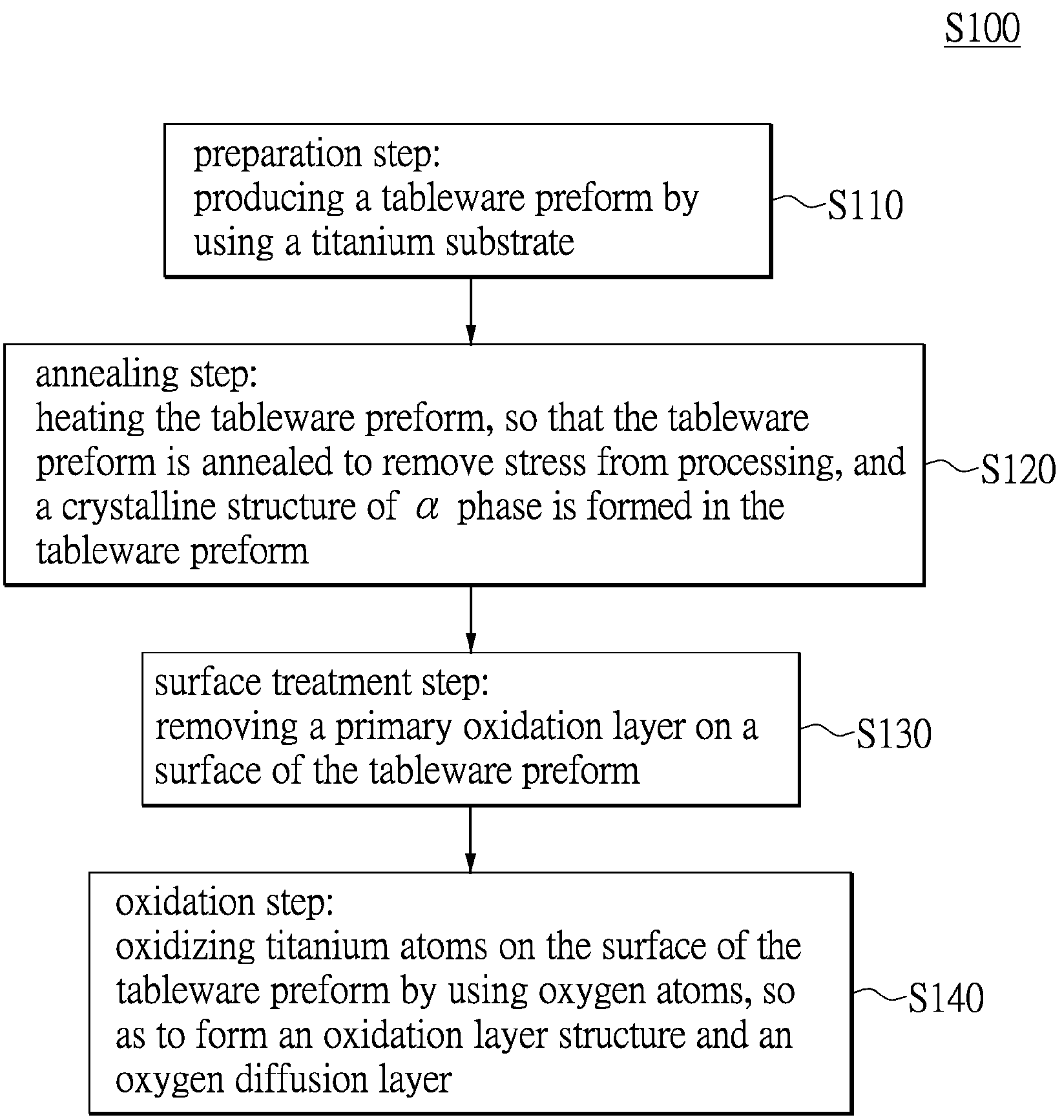
FIG. 9 is a flowchart of a manufacturing method according to the first embodiment of the present disclosure.
Figure 10:
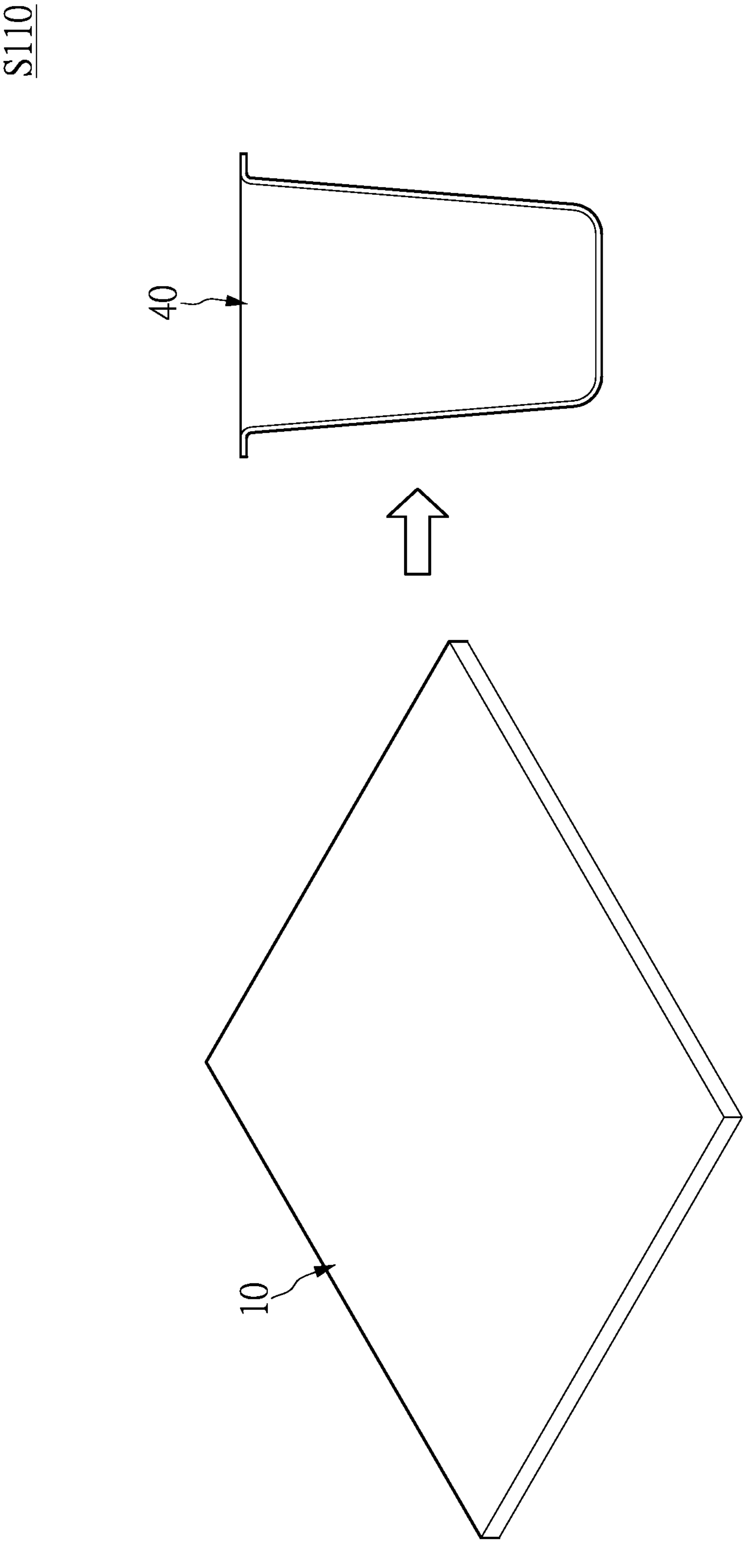
FIG. 10 is a schematic view showing implementation of a preparation step in the manufacturing method according to the present disclosure.

As shown in FIG. 9 and FIG. 10, the preparation step S110 includes: using the titanium substrate 10 to produce a tableware preform 40. Specifically, in the preparation step S110, the titanium substrate 10 can be a pure titanium metal plate or a titanium alloy plate. The titanium substrate 10 can be made into the tableware preform 40 through metal processing processes that include stamping, rolling, forging, welding, etc. Depending on the type of the antimicrobial and adhesion-proof titanium tableware 1, the tableware preform 40 can be shaped into a cup, a bowl, a basin, a plate, a pot, a water bottle, a kettle, a spoon, a knife, chopsticks, a spatula, a straw, etc.

The annealing step S120 includes: removing, after the tableware preform 40 is processed, residual stresses through processes of heating and slow cooling, so that a crystalline structure of α-titanium is formed in the tableware preform 40. In more detail, the annealing step S120 is to place the tableware preform 40 in a vacuum calcination furnace, so that the tableware preform 40 is placed in a vacuum environment and heated to reach a temperature ranging from 600° C. to 800° C. The temperature is maintained for 1 hour to 3 hours, so that the tableware preform 40 is annealed and a crystalline structure of α-titanium is formed in the tableware preform 40.

Figure 11:
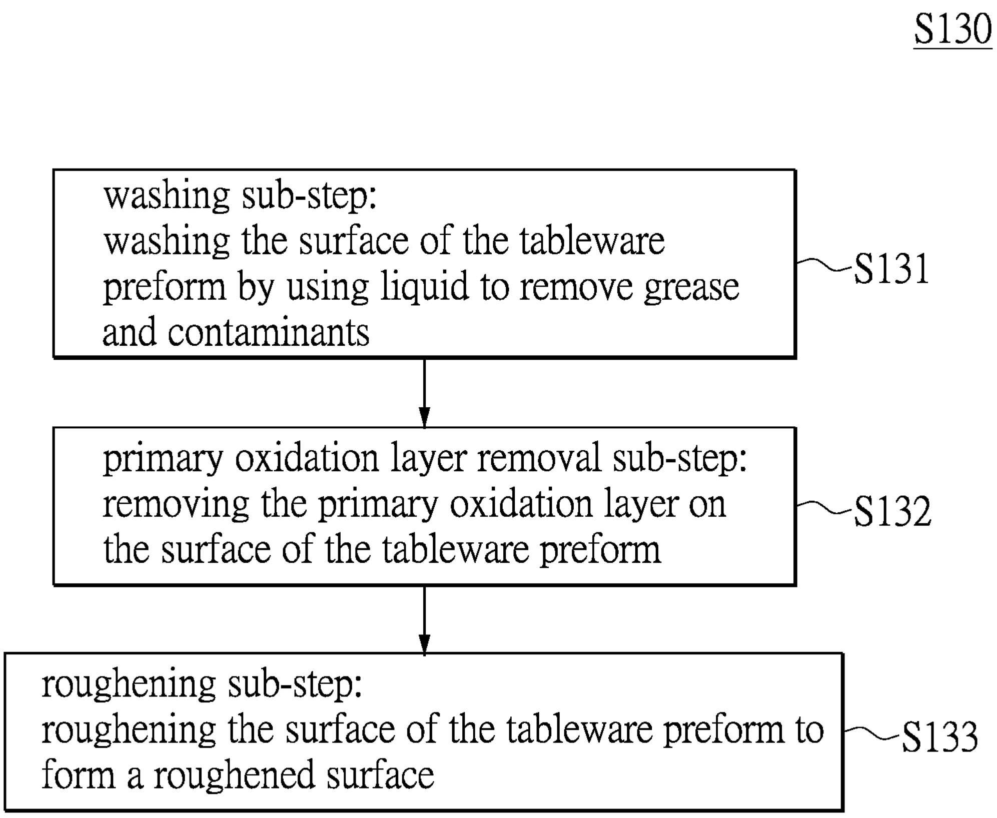
FIG. 11 is a flowchart of a surface treatment step in the manufacturing method according to the present disclosure.

As shown in FIG. 11, the surface treatment step S130 is to clean a surface of the tableware preform 40 and remove the primary oxidation layer on the surface of the tableware preform 40. In more detail, the surface treatment step S130 can include a washing sub-step S131 and a primary oxidation layer removal sub-step S132. The washing sub-step S131 is to remove contaminants and grease from the surface of the tableware preform 40 by a liquid cleaning process. The primary oxidation layer removal sub-step S132 is to remove the primary oxidation layer from the surface of the tableware preform 40 by acid washing, sandblasting, plasma treatment, etc.

In this embodiment of the present disclosure, the surface treatment step S130 can further include a roughening sub-step S133, through which one part of the surface of the tableware preform 40 corresponding to the contact portion 11 and predetermined to form the oxidation layer structure 12 has an increased surface roughness and is formed into a roughened surface. For example, the roughening sub-step S133 can treat the one part of the surface of the tableware preform 40 that is predetermined to form the oxidation layer structure 12 by acid etching and sandblasting, so that the surface of the tableware preform 40 is roughened.

Particularly, although the surface treatment step S130 in this embodiment is arranged after the annealing step S120, the surface treatment step S130 can also be arranged before the annealing step S120 in other embodiments of the present disclosure.

Through the oxidation step S140, the oxygen atoms are combined with the titanium atoms of the one part of the surface of the tableware preform 40 corresponding to the contact portion 11, so that the oxidation layer structure 12 and the oxygen diffusion layer 122 are formed, and the tableware preform 40 is further formed into a finished product of the antimicrobial and adhesion-proof titanium tableware 1.

Figure 12:
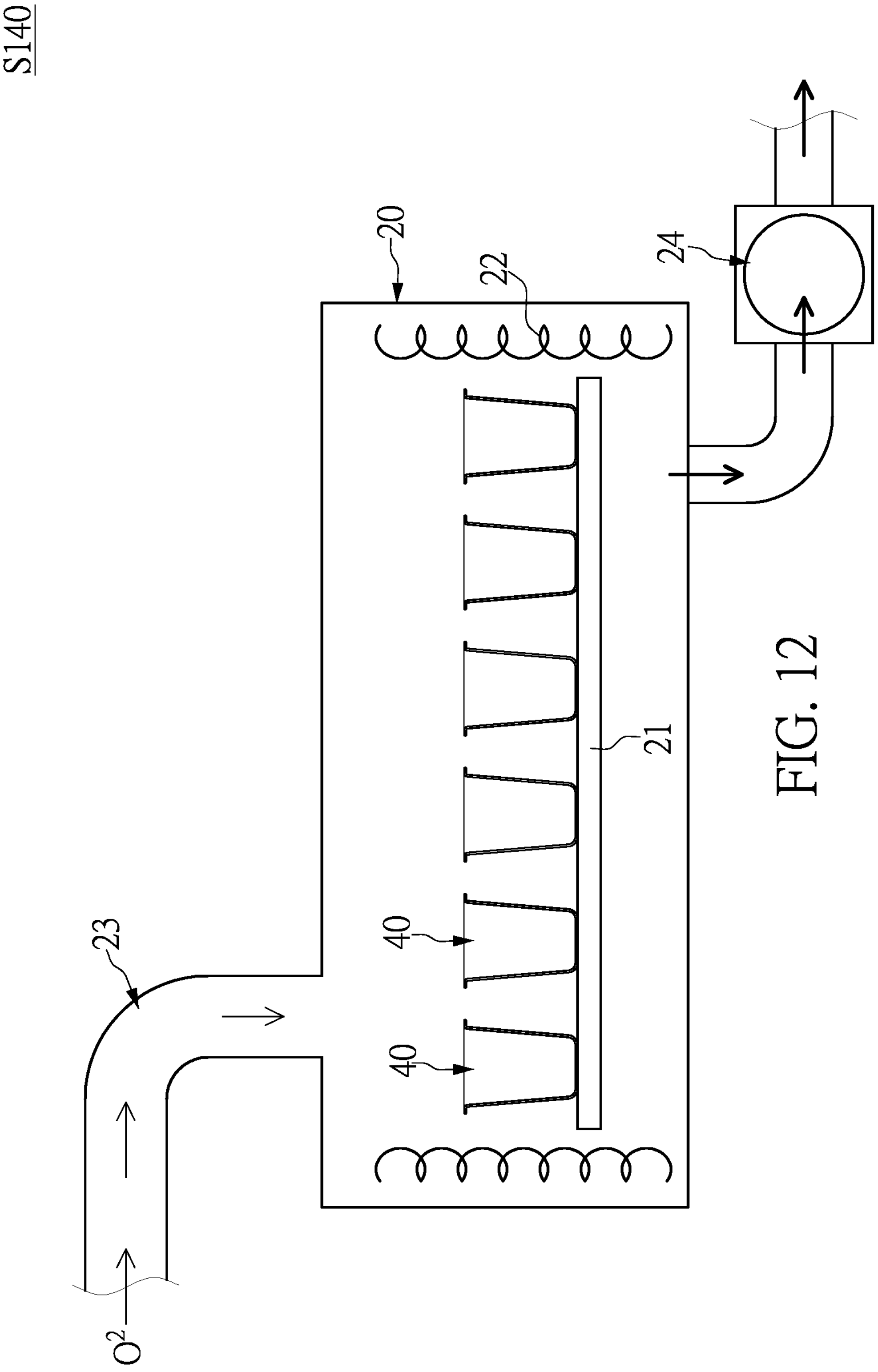
FIG. 12 is a schematic diagram showing formation of the oxidation layer structure in the antimicrobial and adhesion-proof titanium tableware by technical means of thermal oxidation according to the first embodiment of the present disclosure.
Figure 13:
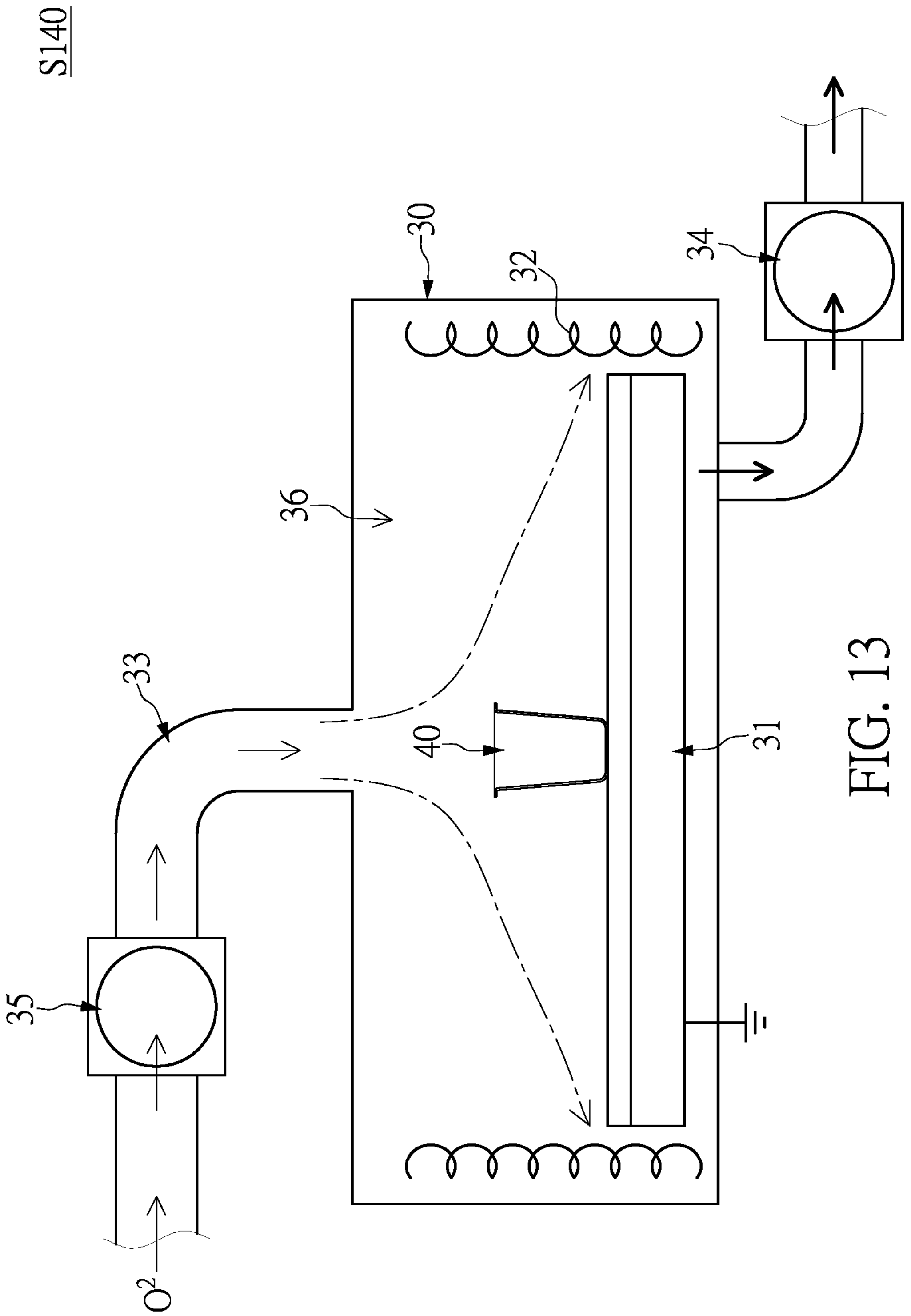
FIG. 13 is a schematic diagram showing formation of the oxidation layer structure in the antimicrobial and adhesion-proof titanium tableware by technical means of plasma treatment according to the first embodiment of the present disclosure.

Reference is made to FIG. 12 and FIG. 13, which show two different examples of the oxidation step S140 of the present disclosure. In the example of FIG. 12, the oxidation step S140 is to form the oxidation layer structure 12 on the tableware preform 40 by thermal oxidation. Here, the oxidation step S140 includes: placing the tableware preform 40 of the antimicrobial and adhesion-proof titanium tableware 1 in a vacuum calcination furnace 20, and introducing oxygen into the vacuum calcination furnace 20 for allowing the tableware preform 40 to be exposed to the oxygen, so that the surface of the tableware preform 40 is oxidized to form the oxidation layer structure 12. Therefore, the tableware preform 40 after oxidation is formed into the finished product of the antimicrobial and adhesion-proof titanium tableware 1.

As shown in FIG. 12, the vacuum calcination furnace 20 includes a support rack 21 for carrying the tableware preform 40, a heating device 22, an evacuation device 24 for causing a vacuum in the vacuum calcination furnace 20, and an intake tube 23 for introducing gas into the vacuum calcination furnace 20. The annealing step S120 and the oxidation step S140 can both be carried out in the vacuum calcination furnace 20. Hence, in this embodiment, the oxidation step S140 can be arranged after the annealing step S120, and after the annealing step S120 is completed, the tableware preform 40 can be kept in the vacuum calcination furnace 20 and be cooled according to a predetermined cooling curve. Afterwards, the heating device 22 is used to raise the temperature of the vacuum calcination furnace 20 to a thermal oxidation temperature, and then oxygen is introduced into the vacuum calcination furnace 20 before implementation of the oxidation step S140.

In the oxidation step S140, firstly, a titanium surface of the tableware preform 40 adsorbs oxygen atoms from the decomposition of oxygen gas, and then the oxygen atoms diffuse in a titanium lattice. When the oxygen atoms reach saturation in the titanium lattice, titanium oxide is formed on the surface of the tableware preform 40. As the oxidation continues, an oxidation layer gradually becomes thicker to form into the oxidation layer structure 12. The oxidation step S140 continues to allow the oxygen atoms to pass through the oxidation layer structure 12, and the titanium dioxide located at an inner side of the oxidation layer structure 12 can form anoxic titanium dioxide due to continuous heating and lack of oxygen. Further, a portion of the oxygen atoms are dissociated and penetrate into the titanium atoms of the titanium substrate 10, which results in formation of the oxygen diffusion layer 122.

Upon completion of the oxidation step S140, the oxidized tableware preform 40 can form into the finished product of the antimicrobial and adhesion-proof titanium tableware 1. The antimicrobial and adhesion-proof titanium tableware 1 has the oxidation layer structure 12 that is titanium dioxide in the rutile crystalline form formed on the surface of the titanium substrate 10 and the oxygen diffusion layer 122 that is located at the inner side of the oxidation layer structure 12.

In more detail, through controlling of an oxidation temperature and an oxidation duration, the oxidation step S140 of the present disclosure is capable of achieving the following goals: the thickness of the oxidation layer structure 12 being greater than 3 μm, the average grain size of the oxidation layer structure 12 being greater than 0.3 μm, the oxidation layer structure 12 having the roughened surface 121, and the arithmetic average roughness (Ra) and the maximum roughness depth (Rmax) of the roughened surface 121 being greater than 0.2 μm and 0.8 μm, respectively.

In this embodiment, the oxidation temperature of the oxidation step S140 ranges from 700° C. to 850° C., and the oxidation duration is between 3 hours and 12 hours. Particularly, the oxidation temperature and the oxidation duration in the oxidation step S140 of this embodiment can be used to control the thickness of the oxidation layer structure 12. As the oxidation temperature gets higher and the oxidation duration gets longer, a surface roughness and a surface porosity of the oxidation layer structure 12 can be increased. However, it should be noted that the oxidation temperature needs to be lower than a temperature at a transformation point of the titanium substrate 10 that transforms from α phase to β phase, and the oxidation duration needs to be shorter than a critical time at which the oxidation layer structure 12 has a flaking phenomenon.

By the abovementioned arrangements, in the oxidation step S140 of the present disclosure, the oxidation layer structure 12 formed on the surface of the titanium substrate 10 can be made of stable titanium dioxide in the rutile crystalline form, and the thickness and the surface roughness of the oxidation layer structure 12 can be as expected. Moreover, after the oxidation layer structure 12 is formed, the oxygen diffusion layer 122 can further be formed at the interface of the inner side of the oxidation layer structure 12 and the titanium substrate 10.

As shown in FIG. 13, in the oxidation step S140 of the present disclosure, the oxidation layer structure 12 and the oxygen diffusion layer 122 can be formed on the surface of the titanium substrate 10 of the antimicrobial and adhesion-proof titanium tableware 1 by technical means of plasma oxidation. The surface treatment step S130 and the oxidation step S140 can be carried out in a plasma treatment apparatus 30. The plasma treatment apparatus 30 includes a vacuum chamber 36, and the vacuum chamber 36 includes a support rack 31, an inlet tube 33, an evacuation device 34, and an ion generation device 35.

In the oxidation step S140, the tableware preform 40 is placed into the vacuum chamber 36, so that the tableware preform 40 is positively charged. The oxygen gas passes through the ion generation device 35 by entering the inlet tube 33, so that the oxygen gas is transformed into a plasma state having separated atoms and electrons. The oxygen atoms in the oxygen gas are ions that are positively charged. Accordingly, when the plasma gas is in contact with the tableware preform 40, electrons of the oxygen ions are attached to the positively charged titanium and cause electron attachment, so that the titanium atoms of the titanium on the surface of the tableware preform 40 are tightly bonded with the negatively charged oxygen ions to form the oxidation layer structure 12.

In this embodiment, the oxidation step S140 is to oxidize the surface of the tableware preform 40 in the vacuum chamber 36 (which is a vacuum environment of $5.0\times10^{-3}$ Torr) with an oxygen flow rate of 30 sccm and a power ranging from 200 W to 300 W. In addition, the oxidation duration ranges from 1 hour to 3 hours.

Second Embodiment

Figure 14:
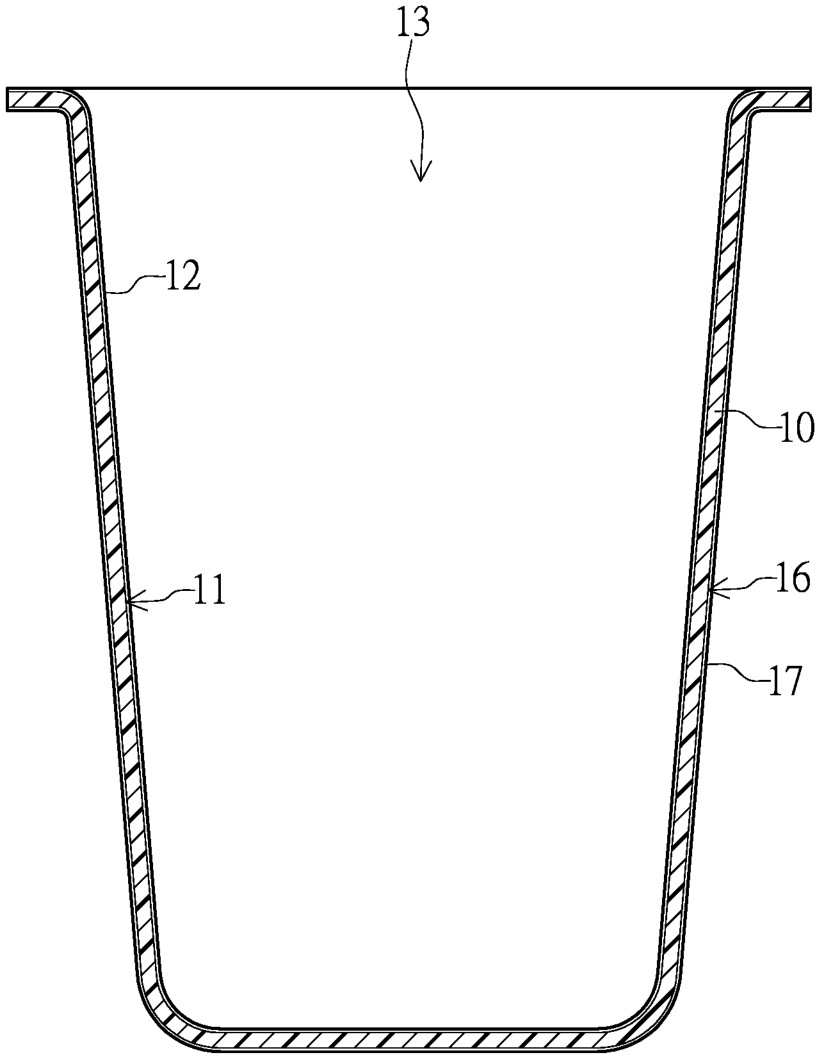
FIG. 14 is a cross-sectional view of an antimicrobial and adhesion-proof titanium tableware according to a second embodiment of the present disclosure.
Figure 15:
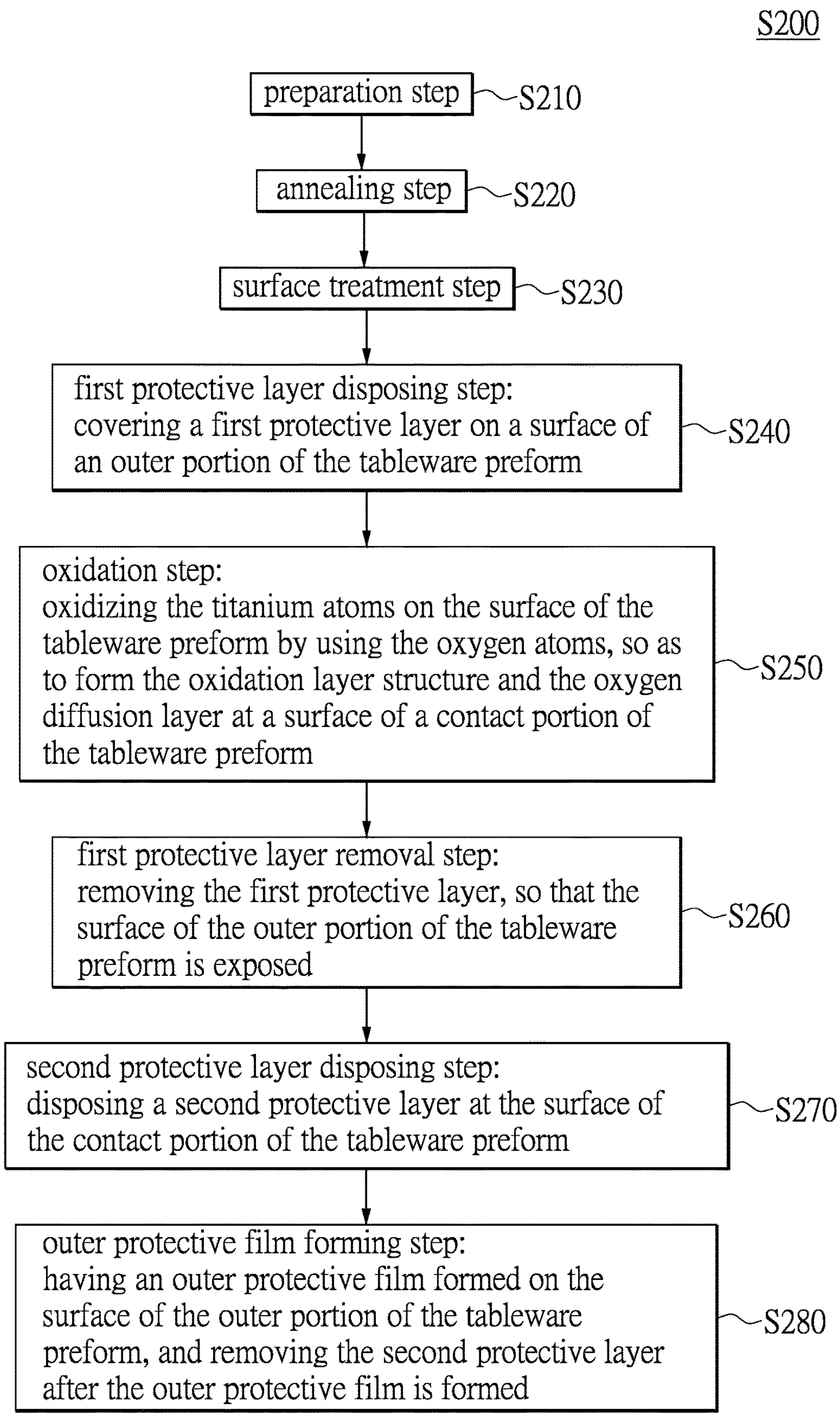
FIG. 15 is a flowchart of a manufacturing method according to the second embodiment of the present disclosure.

As shown in FIG. 14 and FIG. 15, a second embodiment of the present disclosure provides an antimicrobial and adhesion-proof titanium tableware 1. It should be noted that this embodiment is similar to the abovementioned first embodiment, and similarities therebetween will not be repeated herein.

In this embodiment, the antimicrobial and adhesion-proof titanium tableware 1 has an outer portion 16 that is located outside an area of the contact portion 11 and not in contact with the foods, the food ingredients, the drinking water, or the beverages, and an outer protective film 17 is formed on another part of the surface of the titanium substrate 10 corresponding to the outer portion 16. The outer protective film 17 is formed on a surface of the outer portion 16 of the antimicrobial and adhesion-proof titanium tableware 1 by technical means different from technical means used to produce the oxidation layer structure 12, or is formed under processing conditions different from processing conditions from which the oxidation layer structure 12 is produced, so as to protect the titanium substrate 10 at the outer portion 16 from corrosion and abrasion. Moreover, the outer protective film 17 can also be a decorative film having a decorative function.

In more detail, the outer protective film 17 can be formed on the surface of the outer portion 16 of the antimicrobial and adhesion-proof titanium tableware 1 by using ionic oxidation, micro-arc oxidation, electrochemical treatment, and other technical means, or thermal oxidation having the processing conditions different from the processing conditions from which the oxidation layer structure 12 is produced after the oxidation layer structure 12 is formed. The outer protective film 17 can be a film made of a titanium-based compound selected from titanium oxide, titanium nitride, or titanium oxynitride. The outer protective film 17 has a high density, and the outer protective film 17 can have different light reflection rates and produce visual effects of different colors, so as to achieve the effect of improving the aesthetic appearance of the antimicrobial and adhesion-proof titanium tableware 1.

Since the manufacturing method of the second embodiment of the present disclosure is similar to the manufacturing method of the first embodiment, similarities therebetween will not be reiterated herein.

As shown in FIG. 15, a manufacturing method S200 of the second embodiment of the present disclosure includes a preparation step S210, an annealing step S220, a surface treatment step S230, and an oxidation step S250 that are similar to those of the first embodiment, and thus descriptions thereof will not be reiterated.

The manufacturing method S200 of this embodiment further includes a first protective layer disposing step S240 arranged before the oxidation step S250, and a first protective layer removal step S260, a second protective layer disposing step S270, and an outer protective film forming step S280 that are arranged after the oxidation step S250.

The first protective layer disposing step S240 is to dispose a first protective layer (not shown in the figures) on the another part of the surface of the tableware preform 40 corresponding to the outer portion 16. The first protective layer can cover the another part of the surface of the tableware preform 40 corresponding to the outer portion 16, so that the another part of the surface of the tableware preform 40 corresponding to the outer portion 16 does not react with oxygen during the oxidation step S250, thereby allowing the oxidation layer structure 12 to be formed only on the one part of the surface of the tableware preform 40 corresponding to the contact portion 11.

The first protective layer removal step S260 is to remove the first protective layer from the surface of the tableware preform 40 after the oxidation step S250 is completed, so that the another part of the surface of the tableware preform 40 corresponding to the outer portion 16 is exposed.

The second protective layer disposing step S270 is to dispose a second protective layer (not shown in the figures) on the one part of the surface of the tableware preform 40 corresponding to the contact portion 11 and the oxidation layer structure 12 after the oxidation step S250 is completed, and the second protective layer can cover the surface of the oxidation layer structure 12. The second protective layer is used to protect the oxidation layer structure 12 in the subsequent outer protective film forming step S280, so as to prevent the oxidation layer structure 12 from being damaged or contaminated in the outer protective film forming step S280.

The outer protective film forming step S280 is to protect the oxidation layer structure 12 via the second protective layer, to form the outer protective film 17 on the another part of the surface of the tableware preform 40 corresponding to the outer portion 16 by thermal oxidation, plasma treatment, micro-arc oxidation, or electrochemical treatment, and to remove the second protective layer after the outer protective film 17 is formed.

The second embodiment of the manufacturing method of the present disclosure is characterized in that the outer protective film 17 is formed by technical means other than technical means used to produce the oxidation layer structure 12, so that films made of different types of titanium-based compounds (e.g., titanium oxide, titanium nitride, titanium oxynitride) can be used according to requirements. In this way, the oxidation layer structure 12 and the outer protective film 17 can have different characteristics. Furthermore, when the outer protective film 17 is being formed, the oxidation layer structure 12 of the contact portion 11 is protected by the second protective layer and is not exposed to the working gas or liquid used in the outer protective film forming step S280. Accordingly, the oxidation layer structure 12 can be prevented from being damaged due to having reaction with the working gas or liquid, and can also be prevented from being contaminated by the working gas or liquid.

Beneficial Effects of the Embodiments

One of the beneficial effects of the present disclosure is that, in the antimicrobial and adhesion-proof titanium tableware and the manufacturing method of the same provided by the present disclosure, by virtue of "an oxidation layer structure being formed on a surface of the titanium substrate," "the oxidation layer structure being a titanium dioxide film in a rutile crystalline form," and "the oxidation layer structure having a roughened surface," the oxidation layer structure has good, long-lasting and stable catalytic activity, so that the antimicrobial and adhesion-proof titanium tableware of the present disclosure can effectively inhibit the growth of microorganisms. Furthermore, a crystallized and ceramicized surface is formed on the antimicrobial and adhesion-proof titanium tableware to have the adhesion-proof property.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antimicrobial and adhesion-proof titanium tableware made of a titanium substrate, comprising:

a contact portion for contacting foods, food ingredients, drinking water, beverages, or body parts of a user;

an oxidation layer structure formed on one part of a surface of the titanium substrate corresponding to the contact portion, wherein the oxidation layer structure is a titanium dioxide film generated by a combination of the titanium substrate and oxygen atoms; and an outer portion located outside an area of the contact portion and not in contact with the foods, the food ingredients, the drinking water, and the beverages, wherein an outer protective film is formed on another part of the surface of the titanium substrate corresponding to the outer portion, and the outer protective film is formed on the another part of the surface of the titanium substrate corresponding to the outer portion by technical means different from technical means used to produce the oxidation layer structure, and wherein the outer protective film is a film made of a titanium-based compound selected from titanium oxide, titanium nitride, or titanium oxynitride;

wherein the titanium substrate is made of titanium in a phase, and the oxidation layer structure is the titanium dioxide film in a rutile crystalline form that is formed by oxidation of the titanium in a phase; wherein a thickness of the oxidation layer structure is greater than 3 μm, the oxidation layer structure has a roughened surface, an oxygen diffusion layer is formed at an interface of the oxidation layer structure and the titanium substrate, and a thickness of the oxygen diffusion layer is greater than 1 μm.

2. The antimicrobial and adhesion-proof titanium tableware according to claim 1, wherein an average grain size of the oxidation layer structure is greater than 0.3 μm.

3. The antimicrobial and adhesion-proof titanium tableware according to claim 1, wherein an arithmetic average roughness (Ra) and a maximum roughness depth (Rmax) of the roughened surface of the oxidation layer structure are greater than 0.2 μm and 0.8 μm, respectively.

4. The antimicrobial and adhesion-proof titanium tableware according to claim 1, wherein the antimicrobial and adhesion-proof titanium tableware is a cup, a bowl, a plate, a basin, a food container, a bottle, a kettle, a pan, chopsticks, a knife, or a straw.

* * * * *